(No Model.) 2 Sheets—Sheet 1.

C. G. VAN ALSTINE.
PITCH BOARD.

No. 493,048. Patented Mar. 7, 1893.

Witnesses:
E. Behel
L. L. Miller

Inventor:
Cyrenus G. Van Alstine
By A. O. Behel
atty.

THE NORRIS PETERS CO., PHOTO-LITHO., WASHINGTON, D. C.

(No Model.) 2 Sheets—Sheet 2.

C. G. VAN ALSTINE.
PITCH BOARD.

No. 493,048. Patented Mar. 7, 1893.

Witnesses:
E. Behel
L. C. Miller

Inventor:
Cyrenus G. Van Alstine
By A. O. Behel
Atty.

THE NORRIS PETERS CO., PHOTO-LITHO., WASHINGTON, D. C.

UNITED STATES PATENT OFFICE.

CYRENUS G. VAN ALSTINE, OF ROCKFORD, ILLINOIS.

PITCH-BOARD.

SPECIFICATION forming part of Letters Patent No. 493,048, dated March 7, 1893.

Application filed June 13, 1892. Serial No. 436,630. (No model.)

*To all whom it may concern:*

Be it known that I, CYRENUS G. VAN ALSTINE, a citizen of the United States, residing at Rockford, in the county of Winnebago and State of Illinois, have invented certain new and useful Improvements in Adjustable Squares and Gages for Stairwork, of which the following is a specification.

The object of this invention is to construct a square and gage for use in laying out stair work, and consists of two right angle bars held in place by a cross bar and made adjustable in their engagement therewith, one of the right angle bars at their junction made adjustable in order that wedges may be driven under the steps to hold them properly in position.

This invention also consists in a marker for the nose of the step.

Figure 1:
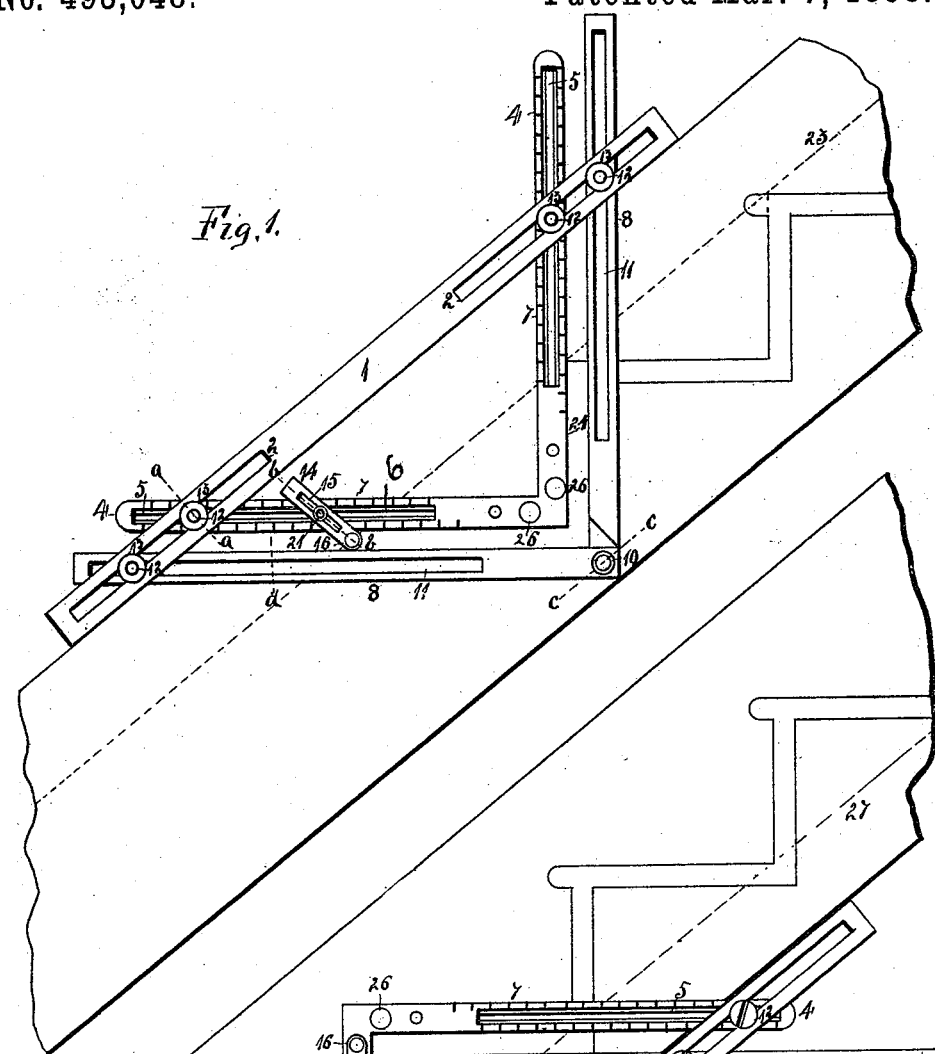
Figure 2:
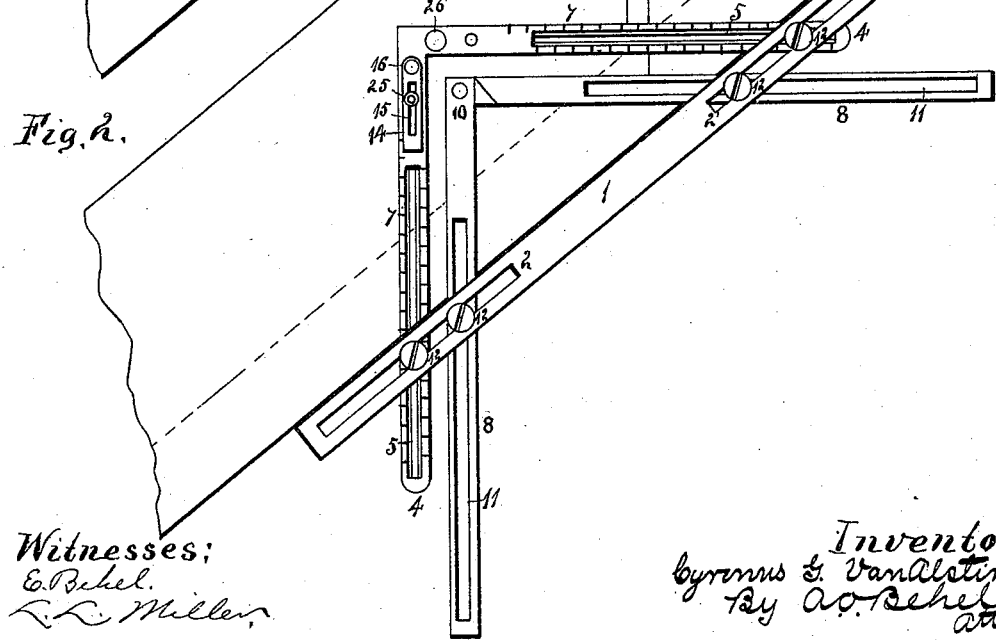
Figure 3:
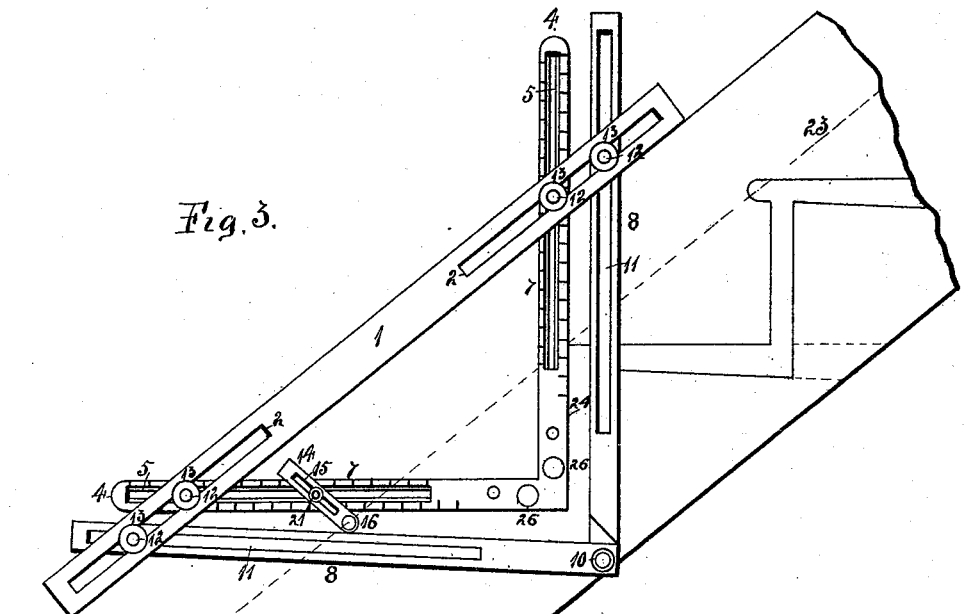
Figure 4:
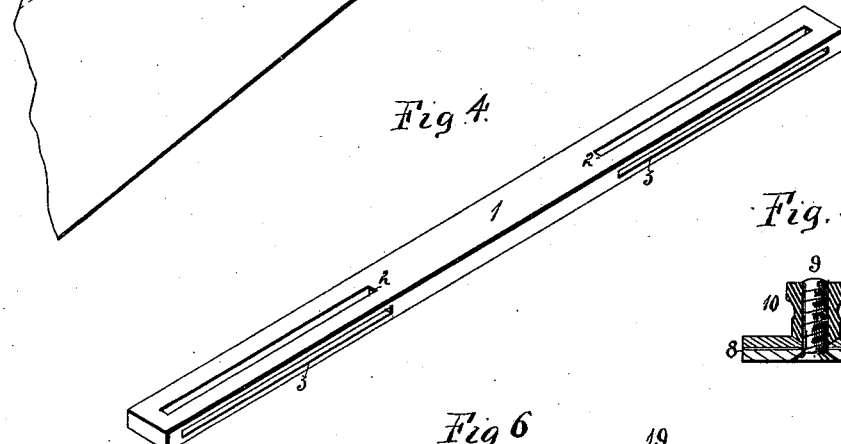
Figure 7:
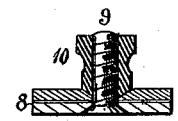
Figures 6, 8:
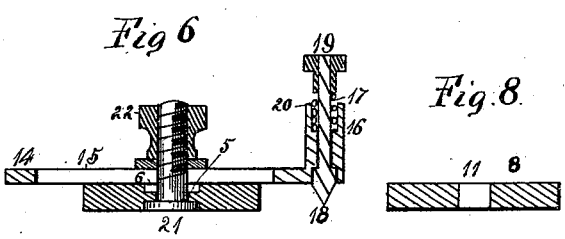
Figure 5:
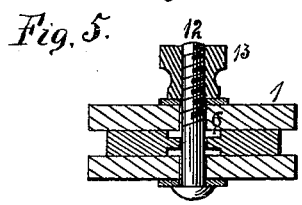

In the accompanying drawings, Figure 1, illustrates the application of my improved square and gage to the upper side of the string. Fig. 2, is an illustration of its application to the lower side of the string. Fig. 3, shows its application to the upper side of a string in which the space for the step is of wedging form. Fig. 4, is an isometrical representation of the cross bar employed to connect the right angle bars. Fig. 5, is a transverse section on dotted line *a* in Fig. 1. Fig. 6, is a transverse section on dotted line *b*, Fig. 1. Fig. 7, is a transverse section on dotted line *c* Fig. 1. Fig. 8, is a transverse section on dotted line *d* Fig. 1.

The cross bar 1, is of rectangular form having vertical slots 2, and horizontal slots 3, extending inward some distance from its ends. The rigid right angled bar is composed of two like arms 4, provided with lengthwise slots 5, extending entirely through the material and its outer faces 6, being enlarged. Both faces of these arms are provided with graduations 7. The other right angled bar is composed of arms 8, pivoted together by means of a clamping screw 9, and thumb nut 10, each countersunk into the arms. The arms at their junction are halved and a lap joint is formed; these are provided with lengthwise slots 11.

In order to connect the right angled bars to the cross bar the arms of the bars are inserted through the horizontal slots 3, of the cross bar and screws 12, are passed through the vertical slots 2, of the cross bar and the slots of the arms, and thumb nuts 13, clasp the parts together, and by means of the various slots the arms of the bars can be adjusted in various positions.

I have constructed a gage for indicating the center of the nose of the step which consists of a base 14 provided with a lengthwise slot 15 and an uprising socket portion 16. The ends of this socket are enlarged and the shaft 17, of the pointer 18, extends upward through the socket and has a cap 19, on its upper end. A spiral spring 20, encircles the upper end of the shank and is located in the upper enlarged recess of the socket, the tendency of which is to hold the pointer elevated, but permit it to be depressed when required. This gage is connected to the arms 4, by a screw 21 whose head is flat and lies within the countersink of the arms and is flush therewith. A thumb nut 22, clamps the gage in position.

In laying out stair work I will describe the method employed in connection with the top of the string. I draw a line 23, in the lengthwise direction of the string at the point of the junction of the top of the step and outer face of the rise. I then measure on the edge 24, of the arms of the bar 4, the distance of the rise from the top of the next step, and on the opposite arm the width of the step less the rise, and firmly clasp this bar to the cross bar. I next locate the arm 8, of the other bar the proper distance from the rigid bar so that the space between their meeting faces will equal the thickness of the riser and of the step respectively. Said arms are then clamped to the cross bar. The gage bar is clamped to the lower arm of the rigid bar. The device thus adjusted is placed in position so that the cross bar will lie in contact with the upper face of the string as shown at Fig. 1, and connecting it near the end of the string the inner faces of the arms are traced with a knife or pencil which will form the space to be occupied by one riser and one step. The nose is formed by depressing the shank 17, which will leave an imprint in the wood which will be the center of the nose. The device is moved along the string until the inner edge 24, of the arm 4, of the riser, crosses the top of the step at its intersection with the line 23, when the inner faces of their arms are again traced and a point for a new nose is formed. This is repeated for each combined step and riser.

In stair building some builders prefer to drive a wedge under the step in order that it may be forced up against its seat. I make the wedge opening by loosening the thumb screw 10, and lower the lower arm until the required bevel is acquired as shown at Fig. 3. In cutting out the groove for the step in this instance I extend the lines of the step to the rear of the string in order that the wedge may be driven in place under the step as shown on dotted lines Fig. 3.

At Fig. 2, I have shown the device as it is used in connection with the underside of the string and in such case the rigid bar is placed on the outside in order that its inner edge will form the upper face of the step and outer face of the riser at right angles to each other. In order to form the point for the nose in this instance I clasp the gage to the arms 4, by a thumb screw 25, the point of the gage extending through circular opening 26 in the arms, said opening being large enough to allow sufficient adjustment of the pointer to bring it in proper position. I work from line 27, which is the inner junction of the step and riser. Both sides of both arms of the rigid bar are made alike so that it may be reversed to lay out a right and left hand string.

I claim as my invention—

1. A square for stair work comprising a rigid right angle bar, an angled-bar adjustable at its angle and a cross bar for holding the right angle bars in position.

2. A square for stair work comprising a rigid right angled bar, an angled bar adjustable at its angle and a cross bar for holding the right angled bars in position, said cross bar provided with slots arranged at right angles to each other.

CYRENUS G. VAN ALSTINE.

Witnesses:
A. O. BEHEL,
L. L. MILLER.